United States Patent
Liu et al.

(10) Patent No.: US 8,976,326 B2
(45) Date of Patent: Mar. 10, 2015

(54) ULTRA SLIM BEZEL STRUCTURE OF LIQUID CRYSTAL DISPLAY DEVICE

(75) Inventors: Ming Liu, Guangdong (CN); Tao Ding, Guangdong (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 364 days.

(21) Appl. No.: 13/381,929

(22) PCT Filed: Nov. 7, 2011

(86) PCT No.: PCT/CN2011/081886
§ 371 (c)(1),
(2), (4) Date: Dec. 31, 2011

(87) PCT Pub. No.: WO2013/063816
PCT Pub. Date: May 10, 2013

(65) Prior Publication Data
US 2013/0114012 A1    May 9, 2013

(30) Foreign Application Priority Data
Nov. 4, 2011  (CN) .......................... 2011 1 0344886

(51) Int. Cl.
G02F 1/1333  (2006.01)
G02F 1/1335  (2006.01)
G02F 1/1339  (2006.01)

(52) U.S. Cl.
CPC ........ G02F 1/133514 (2013.01); G02F 1/1339 (2013.01)
USPC ........................................... 349/122; 349/153

(58) Field of Classification Search
CPC .................................................... G02F 1/1339
USPC .................................. 349/153, 122, 190, 123
See application file for complete search history.

(56) References Cited

U.S. PATENT DOCUMENTS 5,798,813 A * 8/1998 Ohashi et al. ................ 349/154
6,734,942 B2 * 5/2004 Takeuchi ...................... 349/153
(Continued)

OTHER PUBLICATIONS

ISR Translation.*

*Primary Examiner* — Richard Kim
*Assistant Examiner* — Kendrick Hsu
(74) *Attorney, Agent, or Firm* — Cheng-Ju Chiang

(57) ABSTRACT

The present invention relates to an ultra slim bezel structure of liquid crystal display device, which includes a TFT surface having an inner face on which a PI film is arranged, a CF surface having an inner face on which a PI film is arranged, a sealant, and a first color resist barrier and a second color resist barrier. The inner faces of the TFT surface and the CF surface are in registration with each other in a vertical direction and edges of the inner faces of the TFT surface and the CF surface are bonded together with the sealant. The first color resist barrier includes a linear color resist barrier that is formed by continuously arranging color resist on the inner face of the TFT surface adjacent to the sealant to extend along the edge of the TFT surface. The second color resist barrier includes a linear color resist barrier that is formed by continuously arranging color resist on the inner face of the CF surface adjacent to the sealant to extend along the edge of the CF surface. The first color resist barrier and the second color resist barrier oppose each other at upper and lower sides and respectively block spread of the PI films on the TFT surface and the CF surface. The present invention effectively controls spread areas of PI films and realizes an ultra slim bezel design to thereby effectively handle peripheral mura.

5 Claims, 2 Drawing Sheets

(56) References Cited

U.S. PATENT DOCUMENTS

| | | | |
|---|---|---|---|
| 7,088,418 B1 * | 8/2006 | Yamashita et al. | 349/153 |
| 7,999,908 B2 * | 8/2011 | Kim | 349/190 |
| 8,334,963 B2 * | 12/2012 | Yoshida et al. | 349/153 |
| 2005/0073638 A1 * | 4/2005 | Byun et al. | 349/156 |
| 2010/0014042 A1 * | 1/2010 | Komeno et al. | 349/153 |
| 2011/0310336 A1 * | 12/2011 | Kobayashi et al. | 349/106 |
| 2012/0212698 A1 * | 8/2012 | Lee et al. | 349/138 |

* cited by examiner

ULTRA SLIM BEZEL STRUCTURE OF LIQUID CRYSTAL DISPLAY DEVICE

BACKGROUND OF THE INVENTION

1. Field of the Invention

The present invention relates to the field of displaying technology, and in particular to an ultra slim bezel structure of liquid crystal display device.

2. The Related Arts

Slim bezel design of display devices is a trend of development of displaying field. The distance from an edge of a polyimide (PI) film to an active area is the most difficult to control for PI coating facility and mura problems caused by non-uniform thickness of edges of a PI film in a product are particularly severe. The slim bezel designs for TFT-LCD (Thin Film Transistor Liquid Crystal Display) devices are conventionally realized through overlapping the PI film and a sealing material. However, uncontrollable factors of the PI film often results in the finally produced slim bezels being difficult to meet the design requirements that are desired by customers or that are considered idea products. Thus, the known designs of slim bezel of display device need to be further improved.

SUMMARY OF THE INVENTION

An objective of the present invention is to provide an ultra slim bezel structure of liquid crystal display device, which uses color resist barriers to control PI edges, namely controlling distances from PI edges to an active area and also uses a plurality of color resist barriers that are alternately arranged to improve a poor mura phenomenon.

To achieve the objective, the present invention provides an ultra slim bezel structure of liquid crystal display device, which comprises a TFT surface having an inner face on which a PI film is arranged, a CF surface having an inner face on which a PI film is arranged, a sealant, and a first color resist barrier and a second color resist barrier. The inner faces of the TFT surface and the CF surface are in registration with each other in a vertical direction and edges of the inner faces of the TFT surface and the CF surface are bonded together with the sealant. The first color resist barrier comprises a linear color resist barrier that is formed by continuously arranging color resist on the inner face of the TFT surface adjacent to the sealant to extend along the edge of the TFT surface. The second color resist barrier comprises a linear color resist barrier that is formed by continuously arranging color resist on the inner face of the CF surface adjacent to the sealant to extend along the edge of the CF surface. The first color resist barrier and the second color resist barrier oppose each other at upper and lower sides and respectively block spread of the PI films on the TFT surface and the CF surface.

Wherein, a third color resist barrier is further included. The third color resist barrier comprises a dash-line like color resist barrier that is formed by intermittently arranging color resist in a direction extending along the first color resist barrier on the inner face of the TFT surface adjacent to an inner side of the first color resist barrier.

Wherein, a fourth color resist barrier is further included. The fourth color resist barrier comprises a dash-line like color resist barrier that is formed by intermittently arranging color resist in a direction extending along the second color resist barrier on the inner face of the CF surface adjacent to an inner side of the second color resist barrier.

Wherein, a third color resist barrier and a fourth color resist barrier are further included. The third color resist barrier comprises a dash-line like color resist barrier that is formed by intermittently arranging color resist in a direction extending along the first color resist barrier on the inner face of the TFT surface adjacent to an inner side of the first color resist barrier. The fourth color resist barrier comprises a dash-line like color resist barrier that is formed by intermittently arranging color resist in a direction extending along the second color resist barrier on the inner face of the CF surface adjacent to an inner side of the second color resist barrier.

Wherein, after the inner faces of the TFT surface and the CF surface are aligned with and bonded to each other in a vertical direction, the dashes of color resist that form the dash-line like third color resist barrier and the dashes of color resist that form the dash-line like fourth color resist barrier are set alternating each other at upper and lower sides.

Wherein, after the inner faces of the TFT surface and the CF surface are aligned with and bonded to each other, the third color resist barrier and the fourth color resist barrier are distant from the first color resist barrier and the second color resist barrier by gaps that are different.

Wherein, the first color resist barrier and the second color resist barrier are made of a material of blue pixel or photo spacer.

Wherein, the third color resist barrier is made of a material of blue pixel or photo spacer.

Wherein, the fourth color resist barrier is made of a material of blue pixel or photo spacer The efficacies of the present invention are as follows: Through the arrangement of the color resist barriers, the present invention can effectively control the spread area of PI film to completely handle the distance from the PI film edge to the active area, realizing a design of ultra slim bezel. Further, the TFT surface and the CF surface are each provided with spaced dashes of color resist barrier, and this allows of better spread of the PI film at edges to effectively handle peripheral mura.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENT

To more clearly expound the technical solution adopted in the present invention and the advantages thereof, a detailed description will be given below with reference to a preferred embodiment of the present invention and the attached drawings.

Figure 1:
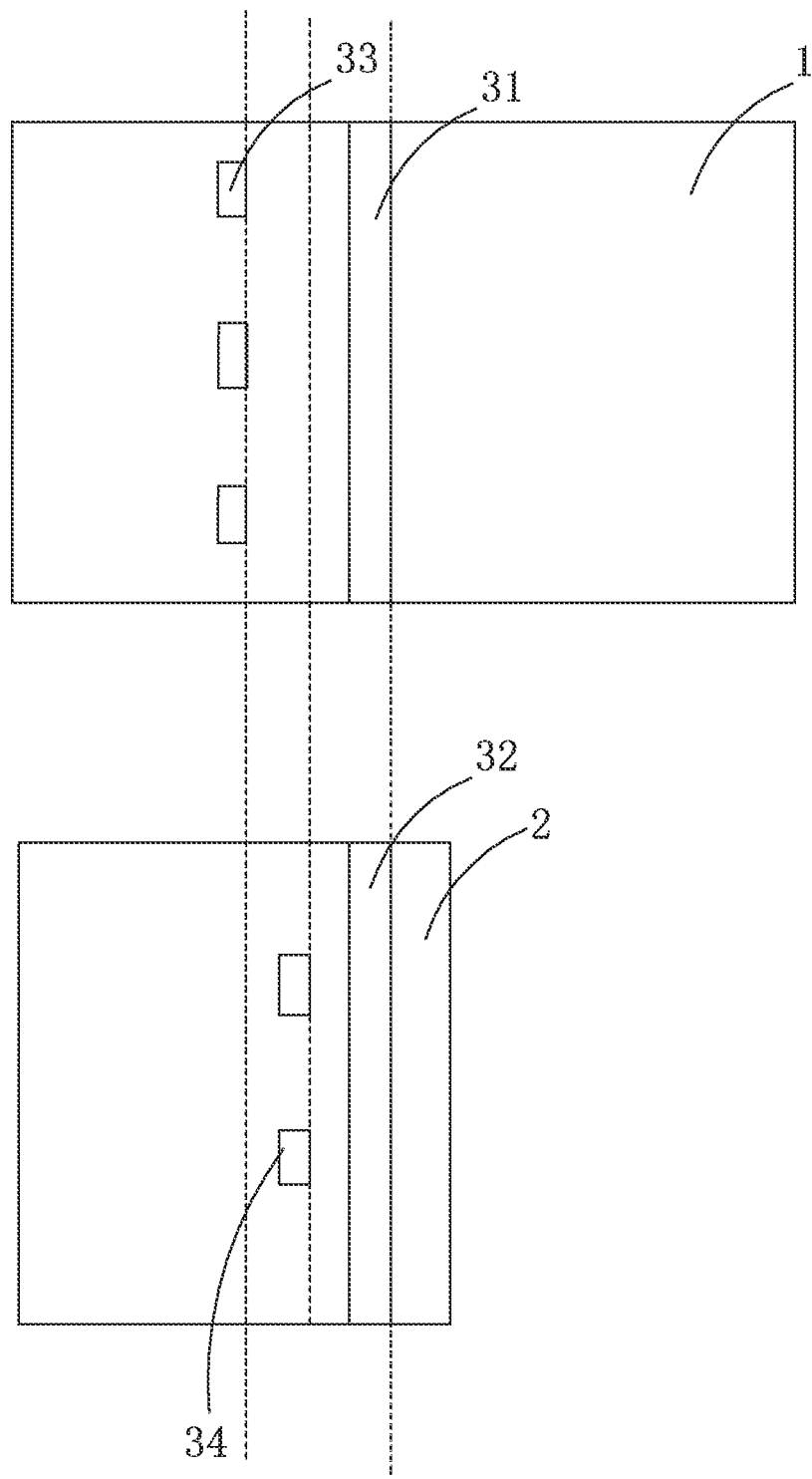
FIG. 1 is a schematic view of an ultra slim bezel structure of liquid crystal display device according to the present invention.

Referring to FIG. 1, which is a schematic view of an ultra slim bezel structure of liquid crystal display device according to the present invention, the ultra slim bezel structure of liquid crystal display device according to the present invention comprises: a TFT surface 1 having an inner face on which a PI (Polyimide) film is formed, a CF (Color Filter) surface 2 having an inner face on which a PI film is formed, a sealant (not shown in drawings), and a first color resist barrier 31 and a second color resist barrier 32. The inner faces of the TFT surface 1 and the CF surface 2 are set in alignment with each other in a vertical direction and edges of the inner faces of the TFT surface 1 and the CF surface 2 are bonded to each other with the sealant. The first color resist barrier 31 comprises a linear color resist barrier that is formed by continuously arranging color resist on the inner face of the TFT surface 1 adjacent to the sealant to extend along the edge of the TFT surface 1. The second color resist barrier 32 comprises a linear color resist barrier that is formed by continuously arranging color resist on the inner face of the CF surface 2 adjacent to the sealant to extend along the edge of the CF surface 2. The first color resist barrier 31 and the second color resist barrier 32 oppose each other at upper and lower sides and respectively block spread of the PI films on the TFT surface 1 and the CF surface 2. It is understood by those having skills of the technical field that the TFT surface 1 refers to a face of a TFT-LCD panel structure on which TFT transistors are mounted, and the CF surface 2 refers to a face to which a color filter is mounted.

The TFT surface 1 further comprises a third color resist barrier 33. The third color resist barrier 33 comprises a dash-line like color resist barrier that is formed by intermittently arranging color resist in a direction extending along the first color resist barrier 31 on the inner face of the TFT surface 1 adjacent to an inner side of the first color resist barrier 31.

The CF surface 2 further comprises a fourth color resist barrier 34. The fourth color resist barrier 34 comprises a dash-line like color resist barrier that is formed by intermittently arranging color resist in a direction extending along the second color resist barrier 32 on the inner face of the CF surface 2 adjacent to an inner side of the second color resist barrier 32.

After the inner faces of the TFT surface 1 and the CF surface 2 are aligned with and bonded to each other in a vertical direction, the dashes of color resist that form the dash-line like third color resist barrier 33 and the dashes of color resist that form the dash-line like fourth color resist barrier 34 are set alternating each other at the upper and lower sides. After the inner faces of the TFT surface 1 and the CF surface 2 are aligned with and bonded to each other, the third color resist barrier 33 and the fourth color resist barrier 34 are distant from the first color resist barrier 31 and the second color resist barrier 32 by gaps that are different. The positional relationship among the color resist barriers can refer to the phantom lines shown in FIG. 1.

The first color resist barrier 31, the second color resist barrier 32, the third color resist barrier 33, and the fourth color resist barrier 34 can be made of a material of blue pixel (color B of RGB) or PS (Photo Spacer). In other words, the masks that are used to make the blue pixels or PS are modified to allow of forming each color resist barrier with the film formation processes.

A new mask for forming B pixels on the CF surface can be added with a mask for color resist barriers according to CF design layout dimension, and then, a regular B pixel formation process (coating, exposure, development, and baking) is carried out; the TFT surface may also be arranged to additionally adopt a color resist barrier mask according to the TFT design layout dimension to carry out exposure in order to form the color resist barriers on the TFT surface by following the film formation process.

Figure 2:
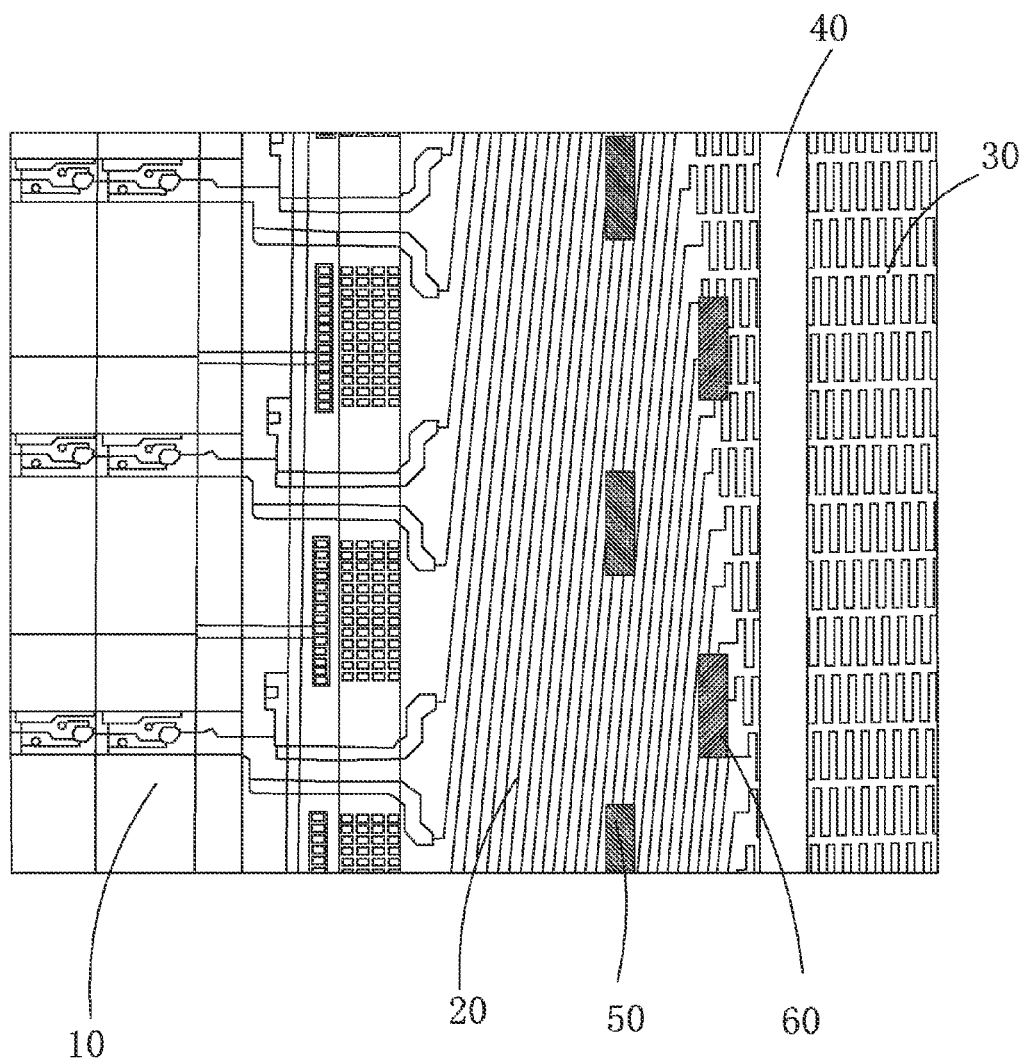
FIG. 2 is an overall top plan view of an ultra slim bezel structure of liquid crystal display device according to a preferred embodiment of the present invention.

Referring to FIG. 2, which is an overall top plan view of an ultra slim bezel structure of liquid crystal display device according to a preferred embodiment of the present invention, and is particularly a schematic view of a portion of the ultra slim bezel structure of liquid crystal display device according to the present invention after being assembled, shown in FIG. 2 are: an edge of active area 10, a PI film area 20, a sealant 30, a color resist barrier 40, a color resist barrier 50 on the TFT surface, and a color resist barrier 60 on the CF surface. In FIG. 2, since the TFT surface and the CF surface are aligned with and bonded to each other in the vertical direction, the PI film area 20 indicates the PI films of both the TFT surface and the CF surface, and an additional color resist barrier is actually present below and overlaps the color resist barrier 40 in position. The color resist barrier 50 on the TFT surface and the color resist barrier 60 on the CF surface are of a dash line configuration composed of dashes of color resist that are set alternating each other at upper and lower sides and are spaced from each other so as not to overlap each other and show a predetermined gap between adjacent ones after being assembled.

The present invention uses color resist to form a barrier for controlling a PI edge, namely controlling the distance from the PI edge to an active area. This barrier is a theoretic boundary for spread of PI film, whereby feasibility of designing an ultra slim bezel is realized. To improve poor mura or worsened mura caused by color resist barriers, spaced dashes of color resist barrier are provided on the CF surface and the TFT surface and an alternating arrangement of multiple color resist barriers are included to improve mura.

The present invention is applicable to the displaying field of TFT-LCD and the likes for various fields of reducing PI halo area, improving spread precision at edge of PI film, designing ultra slim bezel, and improving peripheral mura. Through the arrangement of the color resist barriers, the present invention can effectively control the spread area of PI film to completely handle the distance from the PI film edge to the active area, realizing a design of ultra slim bezel. Further, the TFT surface and the CF surface are each provided with spaced dashes of color resist barrier, and this allows of better spread of the PI film at edges to effectively handle peripheral mura.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An ultra slim bezel structure of a liquid crystal display device, comprising a thin-film transistor (TFT) surface having an inner face on which a polyimide (PI) film is arranged, a color filter (CF) surface having an inner face on which another PI film is arranged, a sealant, and a first color resist barrier and a second color resist barrier, the inner faces of the TFT surface and the CF surface being in alignment with each other in a vertical direction and edges of the inner faces of the TFT surface and the CF surface being bonded together with the sealant, the first color resist barrier comprising a linear color resist barrier that is formed by continuously arranging color resist on the inner face of the TFT surface adjacent to the sealant to extend along the edge of the TFT surface, the second color resist barrier comprising a linear color resist barrier that is formed by continuously arranging color resist on the inner face of the CF surface adjacent to the sealant to extend along the edge of the CF surface, the first color resist barrier and the second color resist barrier opposing each other at upper and lower sides and respectively blocking spread of the PI films on the TFT surface and the CF surface;

wherein the TFT surface further comprises a third color resist barrier solely formed on the inner face of the TFT surface, the third color resist barrier comprising a dash-line like color resist barrier that is formed by intermittently arranging color resist in a direction extending along the first color resist barrier on the inner face of the TFT surface adjacent to an inner side of the first color resist barrier;

wherein the CF surface further comprises a fourth color resist barrier solely formed on the inner face of the CF surface, the fourth color resist barrier comprising a dash-line like color resist barrier that is formed by intermittently arranging color resist in a direction extending along the second color resist barrier on the inner face of the CF surface adjacent to an inner side of the second color resist barrier; and wherein when the inner faces of the TFT surface and the CF surface are aligned with and bonded to each other in a vertical direction, the dashes of color resist that form the dash-line like third color resist barrier and the dashes of color resist that form the dash-line like fourth color resist barrier are respectively and alternately arranged on the TFT surface and the CF surface and alternating each other.

2. The ultra slim bezel structure of a liquid crystal display device as claimed in claim 1, wherein after the inner faces of the TFT surface and the CF surface are aligned with and bonded to each other, the third color resist barrier and the fourth color resist barrier are distant from the first color resist barrier and the second color resist barrier by gaps that are different.

3. The ultra slim bezel structure of a liquid crystal display device as claimed in claim 1, wherein the first color resist barrier and the second color resist barrier are made of a material of blue pixel or photo spacer.

4. The ultra slim bezel structure of a liquid crystal display device as claimed in claim 1, wherein the third color resist barrier is made of a material of blue pixel or photo spacer.

5. The ultra slim bezel structure of a liquid crystal display device as claimed in claim 1, wherein the fourth color resist barrier is made of a material of blue pixel or photo spacer.

* * * * *